United States Patent
Lee et al.

(10) Patent No.: US 9,538,170 B1
(45) Date of Patent: Jan. 3, 2017

(54) CAMERA LENS CLEANING SYSTEM AND METHOD OF USING SAME

(71) Applicant: HON HAI PRECISION INDUSTRY CO., LTD., New Taipei (TW)

(72) Inventors: Hou-Hsien Lee, New Taipei (TW); Chang-Jung Lee, New Taipei (TW); Chih-Ping Lo, New Taipei (TW)

(73) Assignee: HON HAI PRECISION CO., LTD., New Taipei (TW)

( * ) Notice: Subject to any disclaimer, the term of this patent is extended or adjusted under 35 U.S.C. 154(b) by 0 days.

(21) Appl. No.: 14/847,929

(22) Filed: Sep. 8, 2015

(51) Int. Cl.
| H04N 5/225 | (2006.01) |
| H04N 17/00 | (2006.01) |
| G06K 9/62 | (2006.01) |
| G06K 9/46 | (2006.01) |
| G06T 7/40 | (2006.01) |
| B08B 1/04 | (2006.01) |

(52) U.S. Cl.
CPC .............. *H04N 17/002* (2013.01); *B08B 1/04* (2013.01); *G06K 9/4652* (2013.01); *G06K 9/6215* (2013.01); *G06T 7/408* (2013.01); *H04N 5/2251* (2013.01)

(58) Field of Classification Search
CPC .... H04N 5/225; H04N 17/002; H04N 5/2251; G06K 9/4652; G06K 9/6215; B08B 1/04; G06T 7/408
USPC .......................... 348/335, 373, 374, 340, 187
See application file for complete search history.

(56) References Cited

U.S. PATENT DOCUMENTS

| 5,268,735 | A | * | 12/1993 | Hayashi | ............. | G01N 21/9506 250/559.11 |
| 5,870,186 | A | * | 2/1999 | Mogan | ................... | G01N 15/02 250/573 |
| 7,222,388 | B2 | * | 5/2007 | Sugihara | ................ | G03B 17/56 15/310 |
| 7,990,458 | B2 | * | 8/2011 | Kanzaki | ................. | G03B 17/20 348/333.02 |
| 8,950,036 | B2 | * | 2/2015 | Kaihotsu | .............. | H04N 5/2254 15/301 |
| 2003/0193604 | A1 | * | 10/2003 | Robins | ............... | G02B 27/0006 348/335 |
| 2005/0129394 | A1 | * | 6/2005 | Ichikawa | ............... | G03B 17/48 396/429 |
| 2005/0275738 | A1 | * | 12/2005 | Arai | ......................... | B08B 5/02 348/335 |
| 2016/0004144 | A1 | * | 1/2016 | Laroia | .................... | G03B 17/18 348/222.1 |

* cited by examiner

*Primary Examiner* — Trang U Tran
(74) *Attorney, Agent, or Firm* — Zhigang Ma

(57) ABSTRACT

A camera lens cleaning system includes a camera, a cleaning device, a processing unit, and an executing unit configured to move the color testing disk and the cleaning device. The camera is used to capture a plurality of different color images of a color testing disk located below the camera. The processing unit is used to process every adjacent two different color images to obtain a difference color value; thereby the processing unit compares the different color value with a reference color value to determine whether dirt is located on a camera lens of the camera. When the dirt is located on the camera lens, the executing unit is configured to move the cleaning device to clean the camera lens. The disclosure further offers a camera lens cleaning method.

10 Claims, 11 Drawing Sheets

CAMERA LENS CLEANING SYSTEM AND METHOD OF USING SAME

FIELD

The subject matter herein generally relates to camera lens cleaning systems and method, and particularly, to a camera lens cleaning system and method capable of automatically cleaning dirt from a camera lens.

BACKGROUND

Personal communication devices are nearly ubiquitous. The personal communication devices usually include image capturing devices. The common image capturing devices are for example camera modules or video camera modules. Generally, an image capturing device typically includes a lens module to capture an image.

BRIEF DESCRIPTION OF THE DRAWINGS

Implementations of the present technology will now be described, by way of example only, with reference to the attached figures.

DETAILED DESCRIPTION

Figure 1:
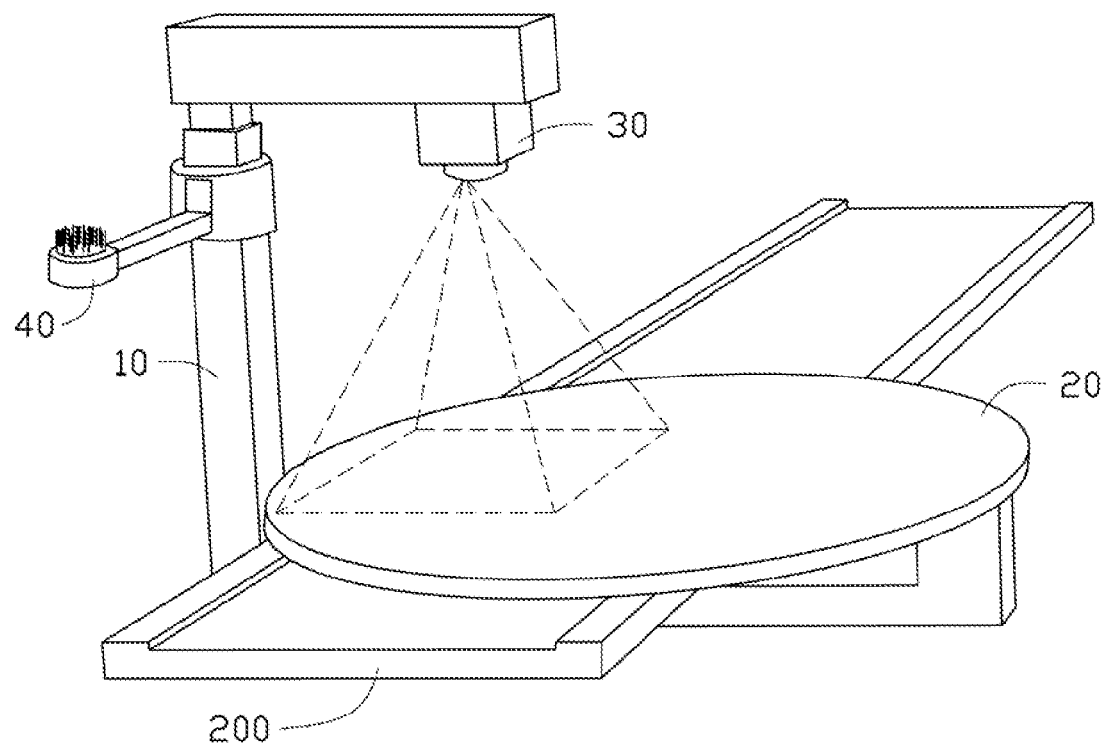
FIG. 1 is an isometric view of an example embodiment of a camera lens cleaning system and a production line.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

The present disclosure is described in relation to a camera lens cleaning system. A camera lens cleaning system includes a camera, a cleaning device, a processing unit, and an executing unit configured to move the color testing disk and the cleaning device. The camera is used to capture a plurality of different color images of a color testing disk located below the camera. The processing unit is used to process every adjacent two different color images to obtain a color difference value, thereby the processing unit compares the color difference value with a reference color value to determine whether dirt is located on a camera lens of the camera. When dirt is located on the camera lens, the executing unit is configured to move the cleaning device to clean the camera lens. The present disclosure further offers a camera lens cleaning method.

Figure 2:
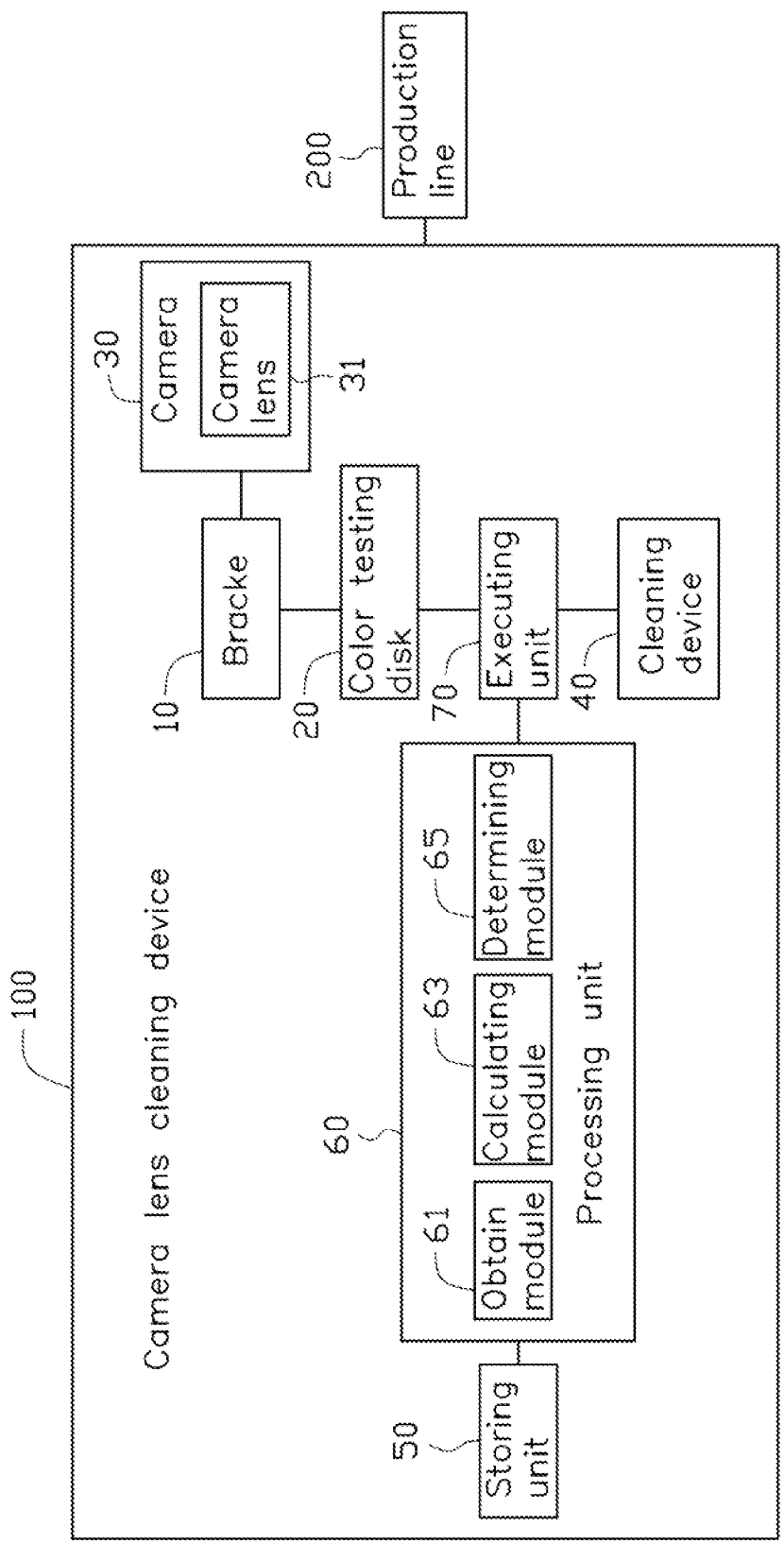
FIG. 2 is a block diagram of an example embodiment of the camera lens cleaning system and the production line of FIG. 1.

FIGS. 1-2 illustrate an embodiment of a camera lens cleaning system 100 configured to be used in a production line 200. The camera lens cleaning device 100 can include a bracket 10, a color testing disk 20 configured to be located on the production line 200, a camera 30 secured to the bracket 10, a cleaning device 40 is rotatably attached to the bracket 10, a storing unit 50, a processing unit 60, and an executing unit 70. In at least one embodiment, the color testing disk 20 is a color circle disk comprising a plurality of different colors. In other embodiments, the color testing disk 20 can be a liquid crystal display which can include a plurality of different colors. FIG. 2 is only one example of the camera lens cleaning system 100, other examples may include more or fewer components than those shown in the embodiment, or have a different configuration of the various components.

The camera 10 can be configured to continuously capture a plurality of color images of the color testing disk 20 to store in the storing unit 50. When the camera 10 needs to capture the plurality of color images of the color testing disk 20, the executing unit 70 can push the color testing disk 20 to be located below a camera lens 31 of the camera 10. Because a central point of the color testing disk 20 cannot be changed, the plurality of color images cannot include the central point of the color testing disk 20.

Figure 3:
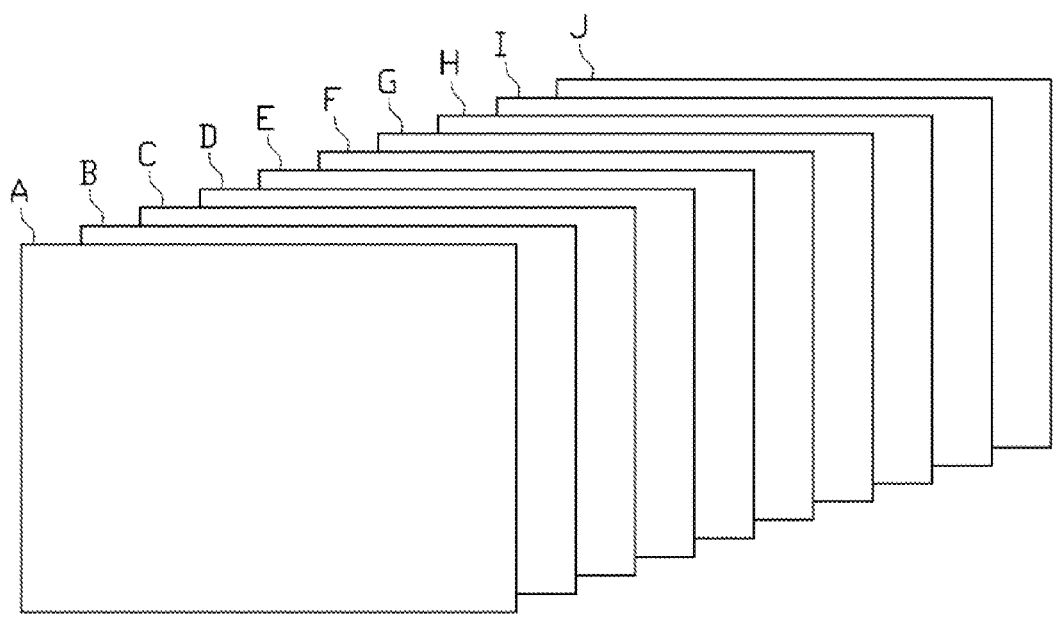
FIG. 3 is a diagrammatic view of a plurality of color images captured by a camera of the camera lens cleaning system of FIG. 1.

FIG. 3 illustrates the plurality of color images captured by the camera 10. A capture frequency of camera 10 can correspond to a rotation frequency of the color testing disk 20. For example, five color images can be captured in one second by the camera 10, when the color testing disk 20 is rotated and the camera 10 captures ten color images in two seconds, such as A, B, C, D, E, F, G, H, I, J can be captured by the camera 10 to be stored in the storing unit 50. A same position of each color image can be acted as a pixel point position, which can include a RGB color value.

Figure 4:
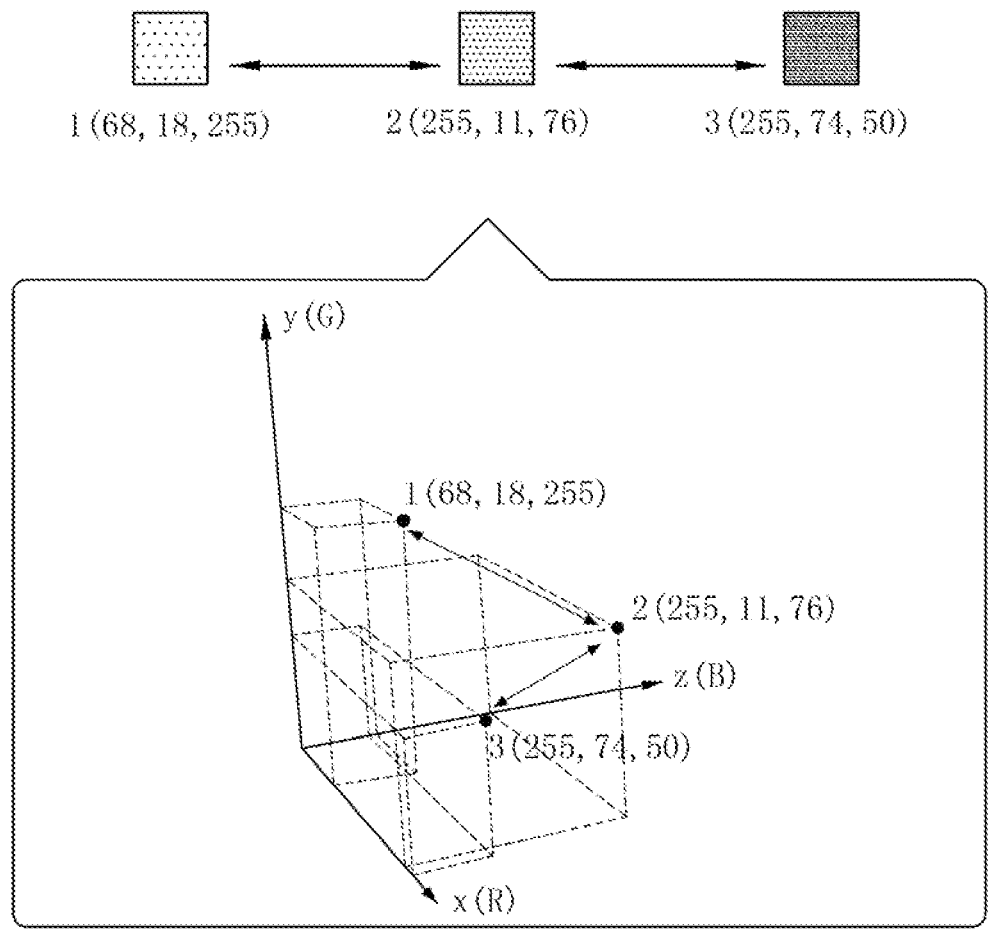
FIG. 4 is a diagrammatic view of the RGB color value of each pixel point being transformed to a 3D coordinate point value.

FIGS. 2 and 4 illustrates the RGB color value of each pixel point being transformed to a 3D coordinate point value. The processing unit 60 can include an obtaining module 61, a calculation module 63 and a determining module 65. The obtaining module 61 is configured to obtain the RGB color values of the plurality of pixel points of each color image in the storing unit 50 to transform the RGB color values to the 3D coordinate point values (X, Y, Z). For example and as shown in FIG. 4, a RGB color value of a pixel point of a same pixel point position P (see FIGS. 5 and 6), such as three color images A, B, C, has been transformed 3D coordinate point values, which include a first 3D coordinate point value 1 (68, 18, 255), a second 3D coordinate point value 2 (255, 11, 76), and a third 3D coordinate point value 3 (255, 74, 50).

The calculation module 63 can calculate a difference color value σ of the same pixel point position between every two adjacent color images according to the 3D coordinate point values. In at least one embodiment, the difference color value σ can be obtained by the formula $$\sigma = \sqrt{(x_2 - x_1)^2 + (y_2 - y_1)^2 + (z_2 - z_1)^2}.$$

Figure 5:
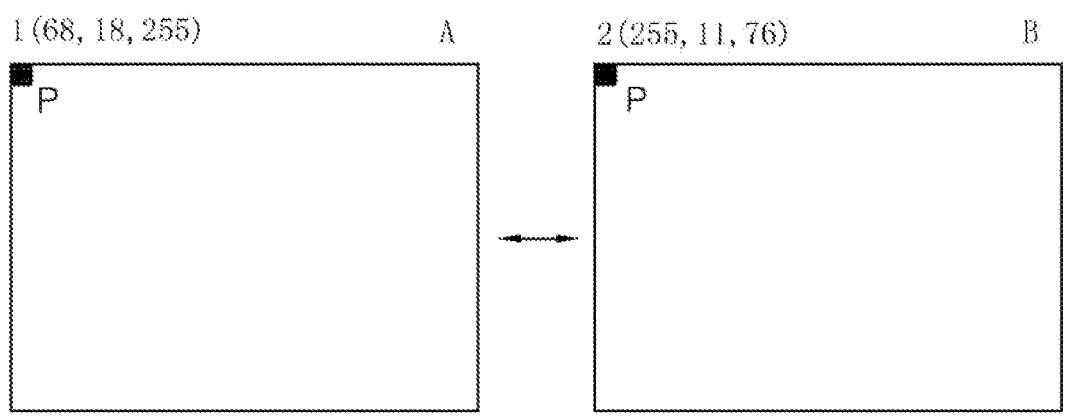
FIG. 5 is a diagrammatic view of the pixel points of the same point P of two adjacent color images A and B of the FIG. 4.

For example and as shown in FIG. 5, the pixel points of the same point P of two adjacent color images A and B. The pixel points of the same point P of two adjacent color images A and B can include the first 3D coordinate point value 1 (68, 18, 255) and the second 3D coordinate point value 2 (255, 11, 76), and the color difference value σ of the same point P is 259 according to the formula $$\sigma = \sqrt{(x_2 - x_1)^2 + (y_2 - y_1)^2 + (z_2 - z_1)^2}.$$

The determining module 65 can compare the color difference value σ with a reference color value ω to obtain whether the color of two adjacent color images is the same. For example, if the color difference value σ of the same pixel point position P is higher than the reference color value ω, the color of two adjacent color images is different, and if the color difference value σ of the same pixel point position P is less than or equal to the reference color value ω, the color of two adjacent color images is the same or similar. In at least one embodiment, the reference color value ω can be 15.

Figure 6:
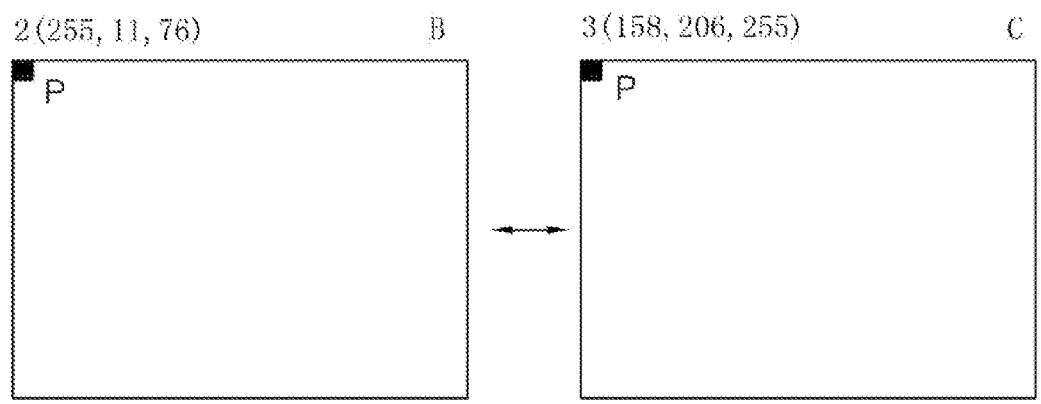
FIG. 6 is a diagrammatic view of the pixel points of the same point P of two adjacent color images B and C of FIG. 4.

FIG. 6 illustrates the pixel points of the same point P of two adjacent color images B and C. The calculation module 63 can calculate all the color difference values σ of a same point between every two adjacent color images, such as, the color difference value σ of the same point P of two adjacent color images B and C, the color difference value σ of the same point P of two adjacent color images C and D, the color difference value σ of the same point P of two adjacent color images D and E, and so on.

Figure 7:
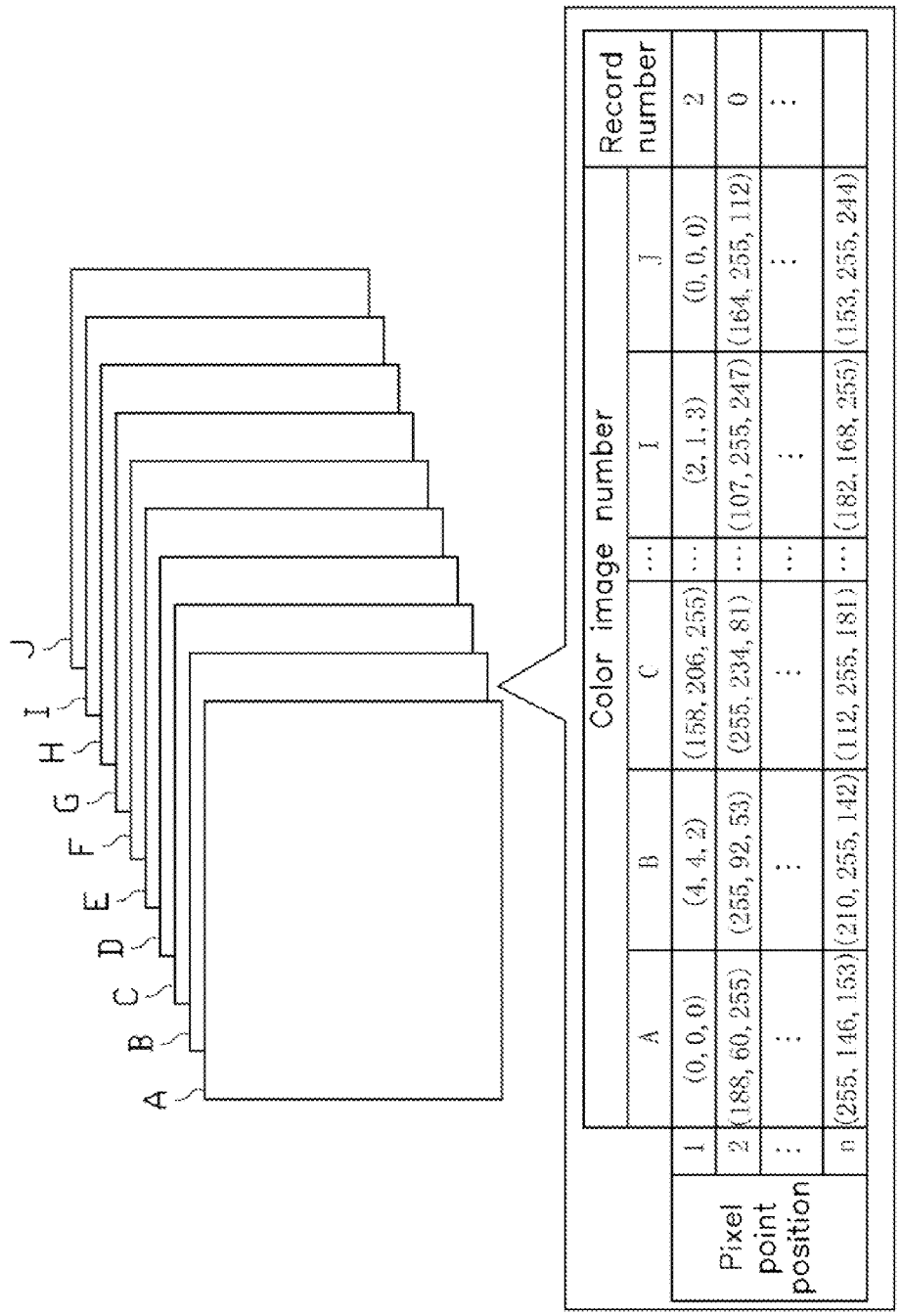
FIG. 7 is a diagrammatic view of the plurality of color images being processed by a determining module of the camera lens cleaning system of FIG. 1.

FIG. 7 illustrates the plurality of color images being processed by the determining module 65. When the color difference value σ of the same pixel point position is less than or equal to the reference color value ω, a record number can be added one time by the determining module 65. When the color difference value σ of the same pixel point position is higher than the reference color value ω, a record does not need to be added by the determining module 65. For example, see FIG. 8, the color difference value σ of the same pixel point position 1 of the two adjacent color images A and B is similar, and the color difference value σ of the same pixel point position 1 of the two adjacent color images I and J is similar, thus, the record number of the same pixel point position 1 is 2. Analogously, the record number of the same pixel point positions (from 1 to N) of all the color images can be obtained by the determining module 65, and the determining module 65 can determine whether dirt is on the camera lens 31 according to the record number.

Figure 8:
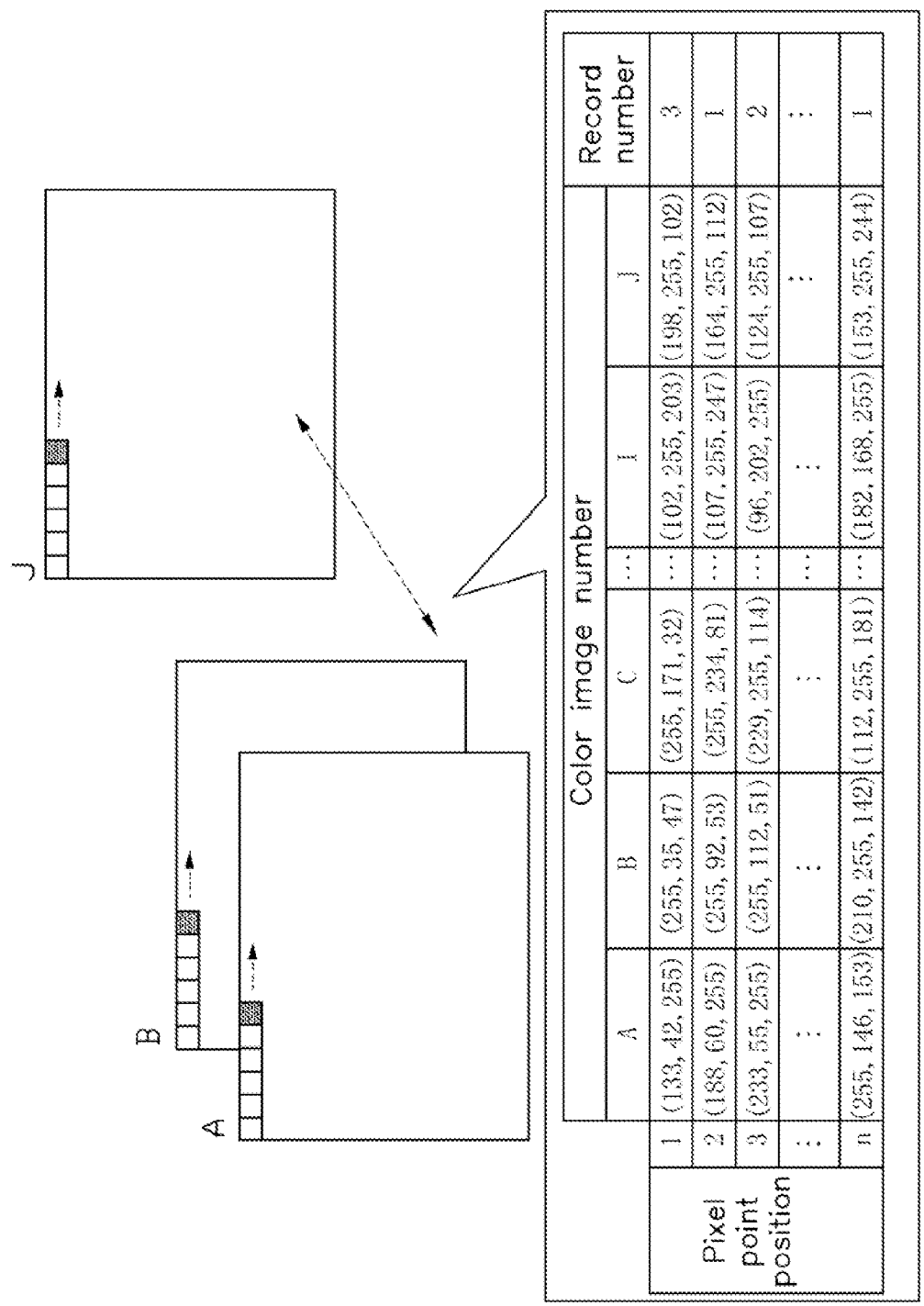
FIG. 8 is a diagrammatic view of no dirt on the camera lens with the plurality of color images being processed by the determining module.

FIG. 8 illustrates no dirt on the camera lens 31. When the record number of the same pixel point positions (from 1 to N) of all the color images is less than a reference ratio, the determining module 65 can determine no dirt is on the camera lens 31. For example, ten color images A, B, C, D, E, F, G, H, I, J are captured by the camera 30, and the reference ratio can be 80% (8). When the record number of the same pixel point positions (from 1 to N) of the ten color images A, B, C, D, E, F, G, H, I, J is less than the reference ratio (80%), no dirt is on the camera lens 31.

Figure 9:
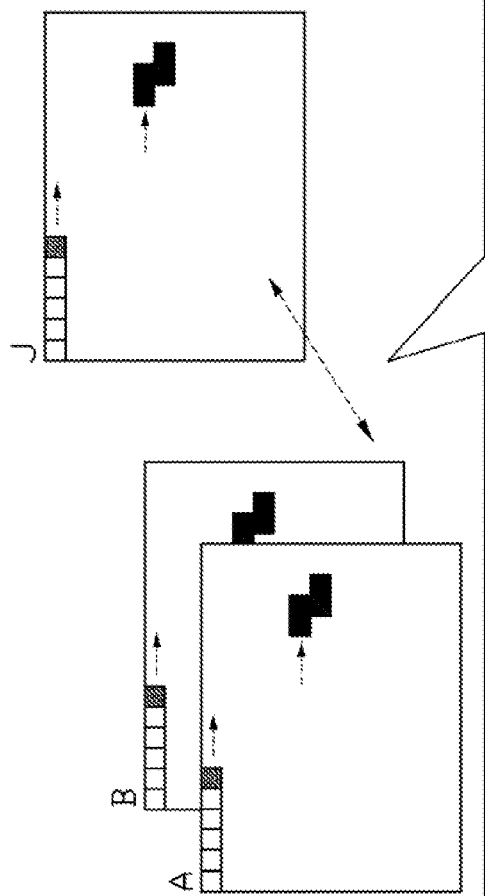
FIG. 9 is a diagrammatic view of dirt on the camera lens with the plurality of color images being processed by the determining module.

FIG. 9 illustrates dirt on the camera lens 31. When the record number of anyone of the same pixel point positions (from 1 to N) of all the color images is higher than the reference ratio, the determining module 65 can determine dirt is on the camera lens 31. For example, ten color images A, B, C, D, E, F, G, H, I, J are captured by the camera 30, and the reference ratio can be 80% (8). When the record number of a same pixel point positions R of the ten color images A, B, C, D, E, F, G, H, I, J is 9 and higher than the reference ratio (80%), and the determining module 65 can determine dirt is on the camera lens 31 and send information to the executing unit 70.

Figure 10:
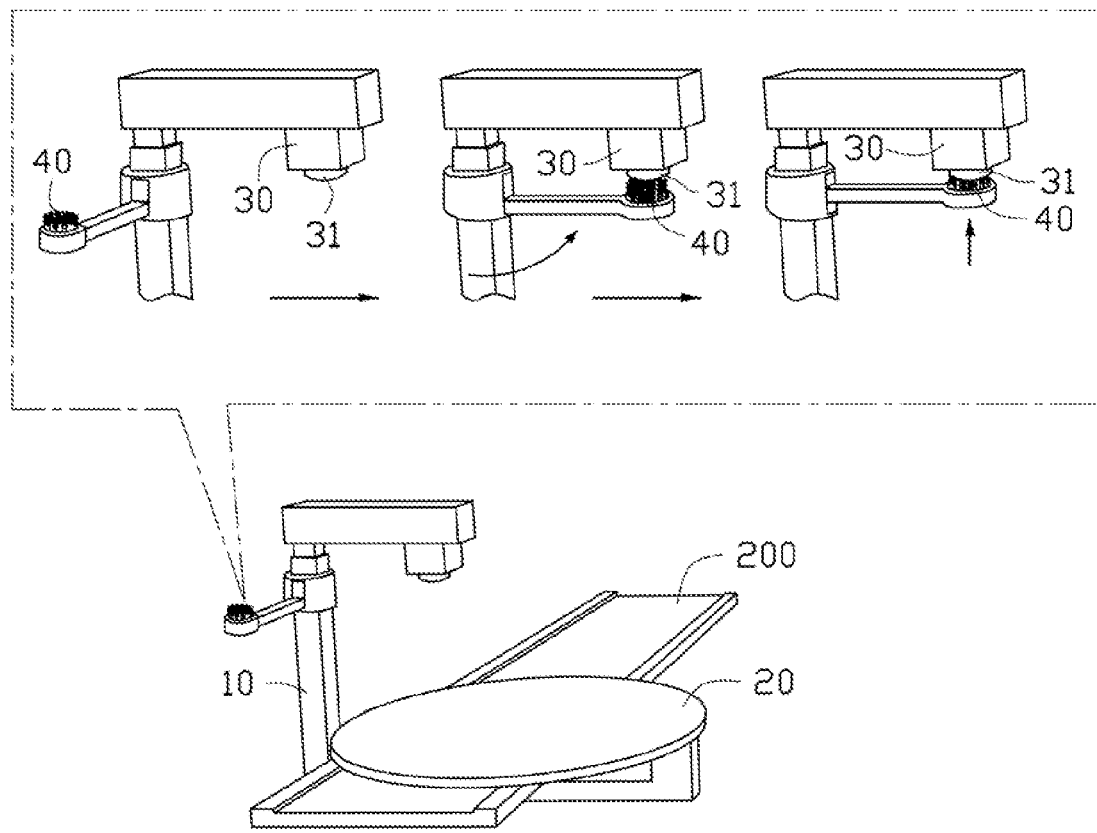
FIG. 10 is a diagrammatic view of the camera lens being cleaned by a cleaning device 40 of the camera lens cleaning system of FIG. 1.

FIG. 10 illustrates the camera lens 31 being cleaned by the cleaning device 40. When the executing unit 70 is receiving information from the determining module 65, the executing unit 70 can rotate the cleaning device 40 relative to the camera 30, for allowing the cleaning device 40 to clean the camera lens 31. When the camera lens 31 is cleaned, the color testing disk 20 can be taken away from the production line 200.

In general, the word "module", as used herein, refers to logic embodied in hardware or firmware, or to a collection of software instructions, written in a programming language. The software instructions in the modules may be embedded in firmware, such as in an erasable programmable read-only memory (EPROM) device. The modules described herein may be implemented as either software and/or hardware modules and may be stored in any type of computer-readable medium or other storage device.

Figure 11:
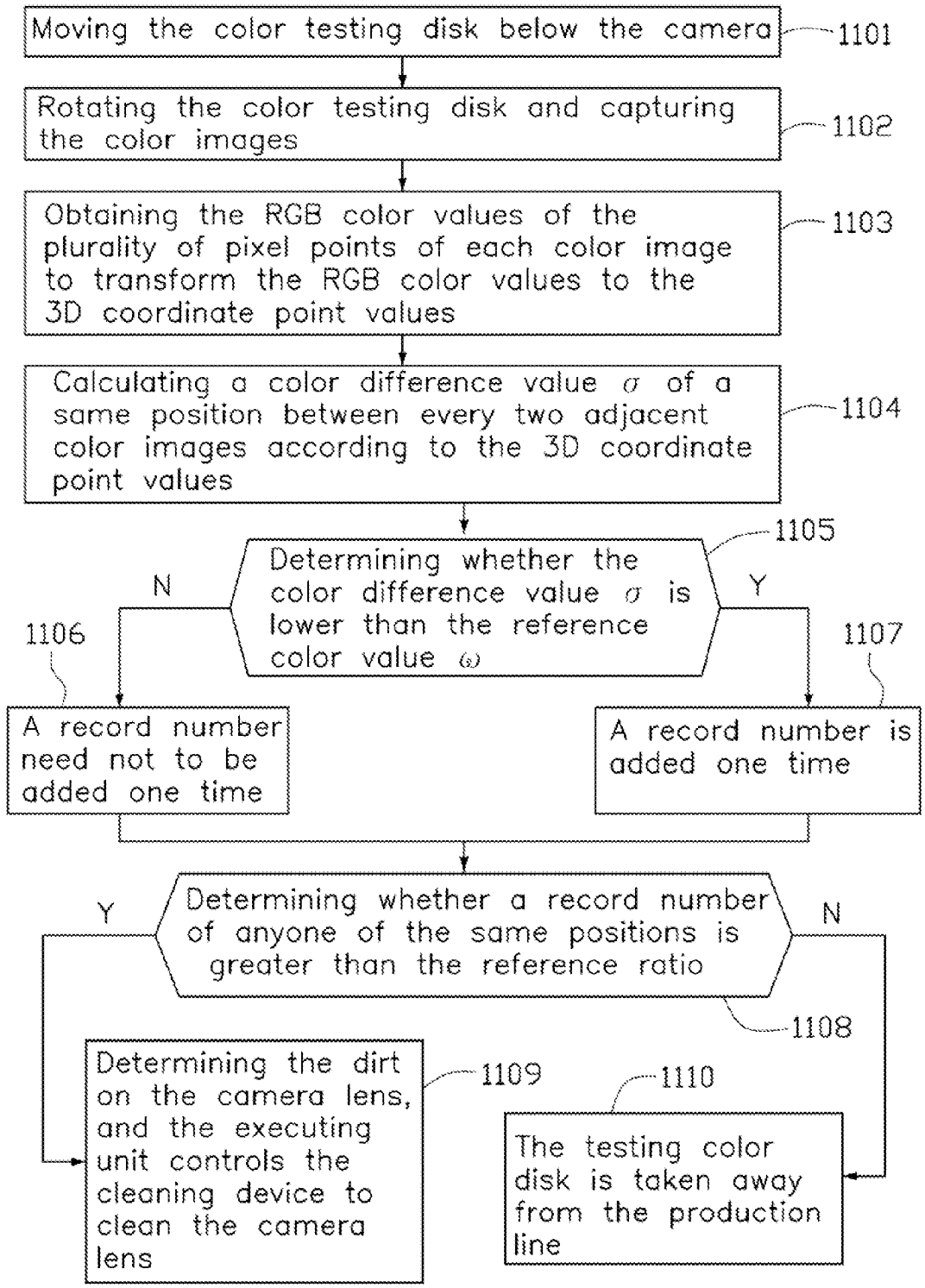
FIG. 11 is a flowchart of a camera lens cleaning method using the camera lens cleaning system of FIG. 1.

Referring to FIG. 11, a flowchart is presented in accordance with an example embodiment which is being thus illustrated. The example method 110 is provided by way of example, as there are a variety of ways to carry out the method. The method 110 described below can be carried out using the configurations illustrated in FIGS. 1-10, for example, and various elements of these figures are referenced in explaining example method 110. Each block shown in FIG. 110 represents one or more processes, methods, or subroutines, carried out in the exemplary method 110. Additionally, the illustrated order of blocks is by example only and the order of the blocks can change. The exemplary method 110 can begin at block 1101.

At block 1101, the color testing disk 20 is moved below the camera 30 by the executing unit 70.

At block 1102, the color testing disk 20 is rotated by the executing unit 70, and the color images are captured and stored by the camera 30. For example, ten color images A, B, C, D, E, F, G, H, I, J are captured and stored by the camera 30.

At block 1103, the obtaining module 31 obtains the red green blue (RGB) color values of the plurality of pixel points of each color image in the storing unit 50 to transform the RGB color values to the 3D coordinate point values. For example and see FIG. 4, a RGB color value of a pixel point of a same pixel point position P (see FIGS. 5 and 6), such as three color images A, B, C, being transformed 3D coordinate point values, which include a first 3D coordinate point value 1 (68, 18, 255), a second 3D coordinate point value 2 (255, 11, 76), and a third 3D coordinate point value 3 (255, 74, 50).

At block 1104, the calculating module 63 calculates a difference color value σ of the same pixel point position between every two adjacent color images according to the 3D coordinate point values. In at least one embodiment, the difference color value σ can be obtained by the formula $$\sigma = \sqrt{(x_2 - x_1)^2 + (y_2 - y_1)^2 + (z_2 - z_1)^2}.$$

At block 1105, the determining module 65 compares the difference color value σ with the reference color value ω to determine whether the difference color value σ is lower than the reference color value ω. If no, goes to block 1106, if yes, goes to block 1107.

At block 1106, a record number does not need to be added by the determining module 65.

At block 1107, a record number is added one time by the determining module 65.

At block 1108, the record numbers of the same pixel point positions (from 1 to N) of all the color images are obtained by the determining module 65, and the determining module 65 determines whether a record number of anyone of the same pixel point positions is greater than the reference ratio. If yes, goes on the block 1109, and if no, goes on to block 1110. For example, ten color images A, B, C, D, E, F, G, H, I, J are captured by the camera 30, and the reference ratio can be 80% (8). When the record number of a same pixel point positions R of the ten color images A, B, C, D, E, F, G, H, I, J is 9, the current ratio 90% (nine out of ten) can be higher than the reference ratio (80%).

At block 1109, the determining module 65 determines dirt is on the camera lens 31 and sends information to the executing unit 70, and the executing unit 30 controls the cleaning device 40 to clean the camera lens 31. When the camera lens 31 is cleaned, the color testing disk 20 can be taken away from the production line 200.

At block 1110, the color testing disk 20 can be taken away from the production line 200.

The embodiments shown and described above are only examples. Many details are often found in the art such as the other features of a camera lens cleaning system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera lens cleaning system comprising:
  a bracket;
  a camera secured to the bracket and configured to capture a plurality of different color images from color testing disk located below the camera;
  a cleaning device rotatably attached to the bracket;
  a processing unit configured to process pairs of adjacent different color images on the testing disk and to determine a difference color value each pair; and
  an executing unit configured to rotate the color testing disk and the cleaning device;
  wherein the processing unit is configured to compare the different color value with a reference color value to determine whether dirt is located on a camera lens of the camera, and when the dirt is located on the camera lens, the executing unit is configured to control the cleaning device to clean the camera lens,
  further comprising a storing unit, wherein the plurality of different color images is stored in the storing unit;
  wherein the processing unit comprises an obtain module, a calculating module and a determining module, the obtain module is configured to obtain RGB color values of the plurality of pixel points of each color image in the storing unit to transform the RGB color values to 3D coordinate point values, the calculating module is configured to calculate the difference color value of a same pixel point position between every two adjacent color images according to the 3D coordinate point values, and the determining module is configured to compare the different color value with the reference color value;
  wherein the different color value is obtained by the calculating module according to the formula $$\sqrt{(x2 - x1)^2 + (y2 - y1)^2 + (z2 - z1)^2};$$

wherein when the difference color value is less than or equal to the reference color value, a record number is added one time by the determining module, and when the difference color value is higher than the reference color value, a record number is not added one time by the determining module.

2. The camera lens cleaning system of claim 1, wherein when the record number of anyone of the pixel points of the plurality of different color images is higher than the reference ratio, the determining module is configured to determine the dirt is existed on the camera lens.

3. The camera lens cleaning system of claim 1, wherein the cleaning device is rotatable relative to the camera to clean the camera lens.

4. The camera lens cleaning system of claim 1, wherein the color testing disk is a color circle disk which comprising a plurality of different colors.

5. The camera lens cleaning system of claim 1, wherein the color testing disk is a liquid crystal display which comprising a plurality of different colors.

6. A camera lens cleaning method comprising:
  (a) obtaining a plurality of different color images of a color testing disk by a camera;
  (b) processing every adjacent two different color images to obtain a difference color value by a processing unit;
  (c) comparing the different color value with a reference color value to determine whether dirt is located on a camera lens of the camera by the processing unit; and (d) when the dirt is located on the camera lens, moving the cleaning device to clean the camera lens by an executing unit, wherein before the step (b) includes following step: storing the plurality of different color images in a storing unit;

wherein the step (b) includes following step: obtaining RGB color values of the plurality of pixel points of each color image in the storing unit to transform the RGB color values to 3D coordinate point values, and calculating the difference color value of a same pixel point position between every two adjacent color images according to the 3D coordinate point values, and comparing the different color value with the reference color value;

wherein the different color value is obtained by the calculating module according to the formula $$\sqrt{(x2-x1)^2 + (y2-y1)^2 + (z2-z1)^2} \;;$$

wherein the step ⓒ includes following step: when the difference color value is less than or equal to the reference color value, adding a record number one time by the determining module, and when the difference color value is higher than the reference color value, no record number is added one time by the determining module.

7. The camera lens cleaning method of claim 6, wherein the step (c) further includes following step: when the record number of anyone of the pixel points of the plurality of different color images is higher than the reference ratio, determining the dirt being existed on the camera lens by the determining module.

8. The camera lens cleaning method of claim 6, wherein before the step (a) includes following step: moving the color testing disk below the camera and rotating the color testing disk for being captured by the camera.

9. The camera lens cleaning method of claim 6, wherein the color testing disk is a color circle disk which comprising a plurality of different colors.

10. The camera lens cleaning method of claim 6, wherein the color testing disk is a liquid crystal display which comprising a plurality of different colors.

* * * * *